United States Patent Office 3,014,057
Patented Dec. 19, 1961

3,014,057
PREPARATION OF MEVALONIC ACID 5-PHOSPHATE
Franklin M. Robinson, Metuchen, and Paul Wittreich, Colonia, N.J., assignors to Merck & Co., Inc., Rahway, N.J., a corporation of New Jersey
No Drawing. Filed May 20, 1958, Ser. No. 736,478
1 Claim. (Cl. 260—461)

This invention relates to mevalonic acid and particularly to a process for the production of a phosphate derivative thereof. Specifically, this product is mevalonic acid 5-phosphate.

Mevalonic acid is useful as a nutritional substance, as is referred to in an article entitled "Isolation of a New Acetate-Replacing Factor" by L. O. Wright et al., J. Am. Chem. Soc., 78, 5273 (1956). Mevalonic acid is known to be a precurser for many important natural products such as steroids and antibiotics and the phosphate is an intermediate in the biosynthesis of some of these natural products. Therefore, the mevalonic acid phosphate of this invention is useful at a more advanced stage in metabolism.

The process of the present invention provides a method for making the mevalonic acid phosphate, shown hereafter as Compound IV, by chemical procedures in the laboratory or on a commercial scale. In accordance with the invention, mevalonic acid 5-phosphate may be synthesized by the following types of reaction:

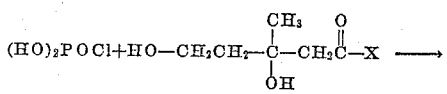

Compound 1        Compound II

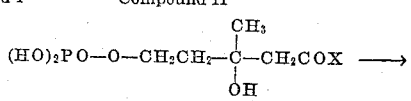

Compound III

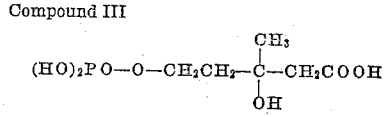

Compound IV

X is a group which prevents the melvalonic acid molecule from forming a δ-lactone under acidic conditions, but can subsequently be removed under reaction conditions which will not cleave the phosphate bond to the 5-oxygen. The reaction with the phosphorochloridic acid must be carried out under reaction conditions which are not sufficiently rigorous to remove the 3-hydroxyl and form a dehydrated compound.

With respect to Compound I, many esters of phosphorochloridic acid are known, and phosphorylation mixtures prepared from phosphorus oxychloride and water or phosphoric acid have been postulated to contain the compound. (Flexser and Farcas, Abstracts of XII International Congress of Pure and Applied Chemistry, New York, N. Y., Sept. 11, 1951.)

In our experience many of these phosphorylation mixtures cause side reactions and degradation of the mevalonic acid. The best results were obtained by mixing phosphorus oxychloride and 85% phosphoric acid so that the following reactions could take place.

$POCl_3 + 2H_2O \rightarrow (HO)_2POCl + 2HCl$
$POCl_3 + 2H_3PO_4 \rightarrow 3(HO)_2POCl$

Compound I

Not enough phosphoryl chloride was used to react with all the phosphoric acid present so that the resulting phosphorylation mixture was a solution of phosphorochloridic acid in 100% phosphoric acid.

With respect to compound II, the group X of the mevalonic acid derivative may be any ester or amide, e.g.

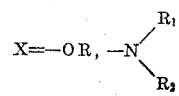

where R, $R^1$ and $R^2$ are alkyl, aryl or aralkyl organic residues.

The Compound II having at X the radicals just mentioned, can be obtained by combining, in conventional manner, mevalonic acid and the appropriate alcohol or primary or secondary amine. As the radical constituting the group X is to be removed to obtain the desired mevalonic acid phosphate, the exact alcohol or amine used is relatively immaterial, so long as it initially protects the carboxyl group and can subsequently be removed.

The group X of Compound III can be removed by hydrolysis, e.g.

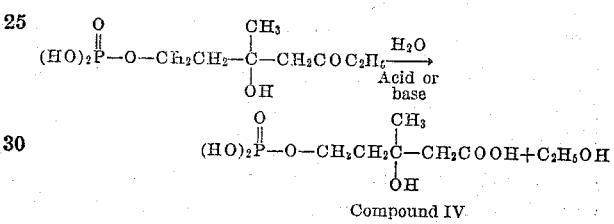

Compound IV

In the case of esters in which R is of the phenyl, benzyl or diphenylmethyl type, the protecting group can be removed by catalytic hydrogenolysis, e.g.

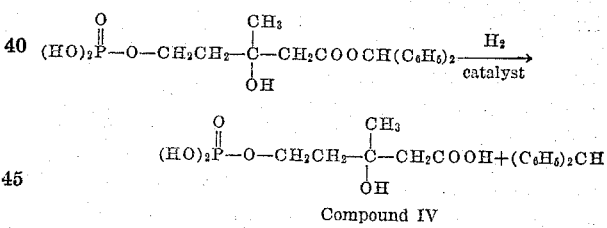

Compound IV

If X is a primary amide it can be converted to a free carboxyl group by the action of nitrous acid, or if X is a substituted amide with $R^1$ and/or $R^2$ equal to an aralkyl residue it can be converted first to the primary amide by hydrogenolysis and then reacted with nitrous acid, e.g.

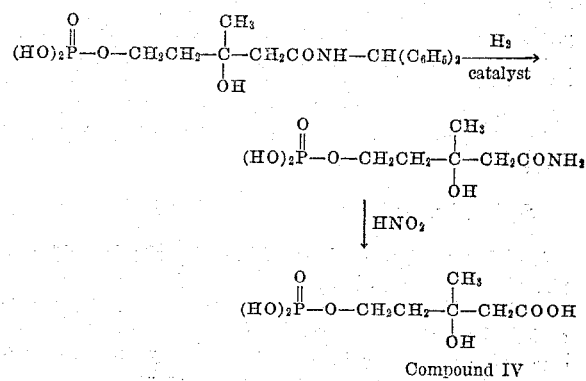

Compound IV

If the X grouping contains an asymmetric center, the derivative of mevalonic acid may be prepared in optically active form, as for example the (+) or (−) form of the phenyl naphthyl methyl amide of mevalonic acid. In this way both optical isomers of mevalonic acid may be prepared.

The reaction between Compound I and Compound II is readily carried out at ambient room temperature and pressure conditions as the reaction proceeds smoothly after the materials have been combined. An increased yield can be obtained by excluding atmospheric moisture by the addition of a drying tube to the reaction vessel. The reaction will have sufficiently progressed in a few hours but it may be best to let it proceed overnight.

The invention will be further clarified by reference to the following examples:

EXAMPLE I

5-phosphate of mevalonic acid benzhydrylamide

A mixture of 6.0 ml. (10.2 g.) of 85% phosphoric acid and 5.6 ml. (9.4 g.) of phosphorus oxychloride was allowed to react until hydrogen chloride was no longer evolved. In this was dissolved 1 g. of the benzhydryl amide of mevalonic acid (M.P. 95–98°). The clear solution was allowed to stand overnight at room temperature and by morning had become cloudy and a yellow oily material had precipitated. It was poured onto a mixture of 100 ml. of chloroform and ice, and the water layer was separated and extracted with two additional 100 ml. portions of chloroform. The combined chloroform solutions were dried with sodium sulfate, the chloroform removed in vacuo, and the residue dried further by distillation of two portions of benzene from it. The oil was leached twice with ether and the residue dissolved again in chloroform. Removal of the chloroform in vacuo left 540 mg. of a white solid. The infrared spectrum was consistent with that expected for the desired product. On a circular paper chromatogram a spot (detected by a phenol blue spray and by U.V. absorption) was present at Rf 0.92 after develoment in a butanol-formic acid-water system (77:10:13).

5-phosphate of mevalonic acid

A mixture of 50 mg. of the crude phosphate of mevalonic acid benzhydryl amide and 1 ml. of N sodium hydroxide was heated on a steam bath. After 1 hour an aliquot was removed and put on a circular paper chromatogram which was developed with the butanol-formic acid-water system. The paper was cut into strips and one section was sprayed with phenol blue. A light spot was visible at Rf 0.27 which was believed to be inorganic phosphate. A dense blue spot at 0.32 was believed to be mevalonic acid 5-phosphate. A corresponding strip was was sprayed with the Haines Isherwood reagent (ammonium molybdate, perchloric acid, and hydrochloric acid). After baking, a yellow spot characteristic of inorganic phosphate) was visible at Rf 0.27. After exposure to U.V. a blue spot (characteristic of organic phosphate) was present at Rf 0.32. A U.V. absorbing spot, undoubtedly benzhydryl amine, was seen at Rf 0.94.

In this developing system mevalonic acid has an Rf of 0.77.

5-phosphate of mevalonic acid benzhydryl ester

Equal parts by weight of 85% phosphoric acid and phosphorus oxychloride are mixed and allowed to react until hydrogen chloride is no longer evolved. To this is added about one tenth part by weight of the benzhydryl ester of mevalonic acid, and the resulting clear solution is allowed to stand for 10–12 hours at room temperature.

The reaction mixture is then poured onto a mixture of chloroform and ice and the chloroform layer is separated. The cold aqueous phase is extracted further with chloroform, and the combined chloroform solutions are evaporated to dryness under reduced pressure. The residue is then shaken with a mixture of ether and water and the layers separated. The aqueous layer is then extracted further with ether and evaporated to dryness leaving the 5-phosphate of mevalonic acid benzhydryl ester.

5-phosphate of mevalonic acid

A solution of the 5-phosphate of mevalonic acid benzhydryl ester in dioxane is shaken with palladium-charcoal catalyst at room temperature and about 3 atmosphere pressure until hydrogen uptake has ceased. The mixture is filtered to remove the catalyst, and the filtrate is evaporated to dryness under reduced pressure. The diphenyl methane formed during reduction is removed by extracting with ether and the 5-phosphate of mevalonic acid remains.

EXAMPLE III

5-phosphate of the α-naphthylphenylmethyl amide of mevalonic acid

Equal parts of phosphorus oxychloride and 85% phosphoric acid are mixed and stirred until evolution of hydrogen chloride has ceased. To the resulting solution about one-tenth part by weight of the (+) α-naphthylphenylmethyl amide of mevalonic acid is added. The mixture is allowed to stand at room temperature for 18 hours and then poured onto a mixture of ice and chloroform. The mixture is shaken thoroughly and the chloroform layer is separated. The aqueous layer is extracted twice more with chloroform. The combined chloroform extracts are dried over sodium sulfate and evaporated to dryness under reduced pressure. The residue is shaken with a mixture of ether and water, and the water layer is then separated and extracted further with ether. The aqueous solution is evaporated to dryness leaving the 5-phosphate of mevalonic acid α-naphthylphenylmethylamide.

EXAMPLE IV

5-phosphate of mevalonic acid amide

A solution of the 5-phosphate of mevalonic acid α-naphthylphenylmethyl amide in dimethoxyethane is shaken with palladium charcoal catalyst at room temperature at two to three atmospheres pressure until hydrogen uptake has ceased. The solution is evaporated to dryness under reduced pressure and the residue shaken with water and ether. The ether layer is removed and the water solution extracted further with ether to complete the removal of phenyl naphthylmethane. The water solution is evaporated to dryness leaving the 5-phosphate of mevalonic acid amide.

5-phosphate of mevalonic acid

An aqueous solution of nitrous acid prepared from equivalent amounts of sodium nitrite and hydrochloric acid is added dropwise to an aqueous solution of the 5-phosphate of mevalonic acid amide. Approximately an equivalent amount of nitrous acid is required and the reaction can be considered complete when evolution of nitrogen ceases.

The resulting solution is passed through a column of a basic ion exchange resin such as Dowex 30 and non acidic components washed off with water. The column is then eluted with aqueous formic acid. The fractions of the eluate containing the 5-phosphate of mevalonic acid are determined by paper chromatographic analysis. These fractions are concentrated to dryness under reduced pressure at low temperature or by lyophillization, leaving the 5-phosphate of mevalonic acid.

What is claimed is:

The process for making mevalonic acid 5-phosphate which comprises combining $(HO)_2POCl$ with a compound having the structure

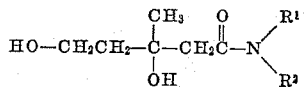

in which $R_1$ and $R_2$ are selected from the group consisting of alkyl, and aryl hydrocarbon radicals free of nonbenzenoid unsaturation and combining the resulting product with a deamidating agent to convert the amide to a free carboxyl group and thereby produce mevalonic acid 5-phosphate.

References Cited in the file of this patent

UNITED STATES PATENTS

| | | |
|---|---|---|
| 2,600,058 | Knowles et al. | June 10, 1952 |
| 2,870,188 | Ratcliffe | Jan. 20, 1959 |

FOREIGN PATENTS

| | | |
|---|---|---|
| 681,065 | Great Britain | Oct. 15, 1952 |
| 308,567 | Switzerland | Oct. 1, 1955 |